US010333712B2

(12) United States Patent
Lu et al.

(10) Patent No.: US 10,333,712 B2
(45) Date of Patent: Jun. 25, 2019

(54) ACTIVATING MOBILE TERMINAL TOKEN METHOD

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 243 days.

(21) Appl. No.: 15/529,099

(22) PCT Filed: Nov. 23, 2015

(86) PCT No.: PCT/CN2015/095282
§ 371 (c)(1),
(2) Date: May 24, 2017

(87) PCT Pub. No.: WO2016/101745
PCT Pub. Date: Jun. 30, 2016

(65) Prior Publication Data
US 2017/0288872 A1    Oct. 5, 2017

(30) Foreign Application Priority Data
Dec. 23, 2014  (CN) .......................... 2014 1 0811778

(51) Int. Cl.
*H04L 29/06* (2006.01)
*H04L 9/32* (2006.01)
(Continued)

(52) U.S. Cl.
CPC ............ *H04L 9/3213* (2013.01); *G06F 21/31* (2013.01); *H04L 9/32* (2013.01); *H04L 63/00* (2013.01);
(Continued)

(58) Field of Classification Search
CPC ....... H04L 9/32; H04L 9/3213; H04L 9/3226; H04L 9/0863; H04L 63/067;
(Continued)

(56) References Cited

U.S. PATENT DOCUMENTS 8,256,664 B1 *  9/2012  Balfanz ................... H04L 63/08
                                                             235/375
8,297,501 B1 * 10/2012  Kowalchyk .......... G06Q 20/102
                                                             235/380

(Continued)

*Primary Examiner* — Eleni A Shiferaw
*Assistant Examiner* — Sher A Khan
(74) *Attorney, Agent, or Firm* — Hammer & Associates, P.C.

(57) ABSTRACT

A method for activating a mobile terminal token, comprising: a cloud authentication server generates a seed generation factor according to an activation request, and acquires a server seed secret key and saves the same according to the seed generation factor, and generates an activation code according to the seed generation factor, and generates an activation verification code and transmits the same to a mobile terminal, and encrypts the activation code using the activation verification code to acquire an encrypted activation code, and a cloud authentication management platform generates a two-dimensional code image according to the received encrypted activation code and transmits the same to a client for displaying, and the mobile terminal token acquires the encrypted activation code according to the acquired two-dimensional code image, and decrypts the encrypted activation code using the acquired activation verification code to obtain an activation code, and acquires the seed generation factor from the activation code, and acquires a token seed secret key according to the seed generation factor and saves the same. The present invention can activate the token when the mobile terminal is without network, ensuring the accuracy of the seed, thus improving the token security.

19 Claims, 4 Drawing Sheets

(51) Int. Cl.
*H04W 8/24* (2009.01)
*H04W 8/26* (2009.01)
*G06F 21/31* (2013.01)
*G06F 21/44* (2013.01)
*H04L 9/08* (2006.01)
*H04W 8/22* (2009.01)

(52) U.S. Cl.
CPC ........... *H04W 8/245* (2013.01); *H04W 8/265* (2013.01); *G06F 21/44* (2013.01); *H04L 9/08* (2013.01); *H04L 65/1073* (2013.01); *H04W 8/22* (2013.01)

(58) Field of Classification Search
CPC . H04L 63/0838; H04L 63/0428; H04L 63/08; H04L 9/0662; H04L 63/04; H04L 63/10; H04L 63/0485; H04L 63/164; H04L 63/083; H04L 63/12; H04L 63/18; H04L 63/0846; H04L 63/101
See application file for complete search history.

(56) References Cited

U.S. PATENT DOCUMENTS

| | | | |
|---|---|---|---|
| 9,654,466 B1* | 5/2017 | Wu | H04L 63/0428 |
| 2007/0186115 A1* | 8/2007 | Gao | H04L 63/0846 |
| | | | 713/184 |
| 2007/0262852 A1* | 11/2007 | Yamamura | G06F 21/31 |
| | | | 340/10.51 |
| 2013/0124855 A1* | 5/2013 | Varadarajan | G06Q 20/3276 |
| | | | 713/155 |
| 2014/0096215 A1* | 4/2014 | Hessler | H04L 63/0869 |
| | | | 726/7 |
| 2015/0009522 A1* | 1/2015 | Caprio da Costa Junior | |
| | | | H04L 9/3234 |
| | | | 358/1.14 |

\* cited by examiner

ACTIVATING MOBILE TERMINAL TOKEN METHOD

TECHNICAL FIELD

The present invention relates to a method for activating mobile terminal token, which relates to information security field and, more particularly, is used in a system including a cloud authentication management platform, a cloud authentication server, a client terminal, and a mobile terminal token.

PRIOR ART

A mobile terminal token, of which a full name is dynamic password mobile terminal token, is a mobile terminal client terminal software for generating a dynamic password. The mobile terminal token is a dynamic password generated by a program running on a mobile terminal. The dynamic password bonds the mobile terminal to perform identity authentication. Communication and fee is not generated in process of generating the dynamic password, which has such advantages as easy use, high security, low cost, requiring no extra mobile device, easy obtaining, no logistics, etc. The mobile terminal token is trend for dynamic password identity authentication in 3G.

A cloud authentication server is an authentication platform based on SaaS mode, which is deployed on the internet and provides reliable identity authentication basic infrastructure; the cloud authentication server provides independent service based on cloud for a website. Mobile terminal token can be used freely by simple integrating, which means security of logging on the website is enhanced greatly.

Two-dimensional code, so called two-dimensional barcode, is a graphical image on which special geometrical figures are distributed in black and white regularly. The two-dimensional code is a key of all information data and used widely.

In the prior art, the dynamic password is obtained by authentication of a hardware token and a server, while the hardware token requires consuming a great quantity of manpower and material resources. The mobile terminal token is generated in such case.

SUMMARY OF THE INVENTION

The object of the present invention is to provide a method for activating a mobile terminal token, which realizes that the token is activated in case that network is not available to the mobile terminal and assures the correct of the seed and enhances security of the token.

Thus, the present invention provides a method for activating a mobile terminal token, which comprises:

Step S1, receiving, by a cloud authentication server, an activation requirement from a cloud authentication management platform, allocating a token sequence number to a username in the activation requirement, generating a seed generating factor, obtaining a server seed key upon the seed generating factor, associating the server seed key to the username and storing the server seed key;

Step S2, generating, by the cloud authentication server, an activation code upon the token sequence number and the seed generating factor and storing the activation code;

Step S3, generating, by the cloud authentication server, an activation authentication code, sending the activation authentication code to a corresponding mobile terminal, encrypting the activation code with the activation authentication code to obtain an encrypted activation code, sending the encrypted activation code to the cloud authentication management platform;

Step S4, generating, by the cloud authentication management platform, a two-dimensional code image upon the encrypted activation code, sending the two-dimensional code to a client terminal Step S5, displaying, by the client terminal, the two-dimensional code image;

Step S6, when a mobile terminal token obtains the two-dimensional code image and the activation authentication code, analyzing, by the mobile terminal token, the two-dimensional code image, obtaining the encrypted activation code, decrypting the encrypted activation code upon the activation authentication code to obtain the activation code;

Step S7, obtaining, by the mobile terminal token, the seed generating factor and the token sequence number from the activation code, storing the token sequence number; and Step S8, obtaining, by the mobile terminal token, a token seed key upon the seed generating factor and storing the token seed key.

Preferably, after Step S8, the method further comprises:

Step T1, generating, by the mobile terminal token, a dynamic password upon the token seed key and displaying the dynamic password;

Step T2, receiving, by the client terminal, a username and the dynamic password input by a user, sending the username and the dynamic password to the cloud authentication server;

Step T3, obtaining, by the cloud authentication server, a corresponding server seed key upon the username, generating a dynamic password upon the server seed key, determining whether the generated dynamic password matches the received dynamic password; if yes, returning a response of successful authentication back to the client terminal, ending the procedure; otherwise, returning a response of failed authentication to the client terminal, ending the procedure.

Preferably, Step S8 specifically comprises:

Step S8-1, performing, by the mobile terminal token, derivation on the seed generating factor by using a preset derivation algorithm to obtain the token seed key; and Step S8-2, encrypting, by the mobile terminal token, the token seed key with the token sequence number to obtain an encrypted token seed key and storing the encrypted token seed key.

Preferably, Step T1 specifically comprises:

Step T1-1, obtaining, by the mobile terminal token, the token sequence number and the encrypted token seed key which are stored inside, decrypting the encrypted token seed key with the token sequence number to obtain the token seed key; and Step T1-2, generating, by the mobile terminal token, the dynamic password by performing operation on the token seed key and the dynamic factor with a password generating algorithm and displaying the dynamic password.

Preferably, in Step S1, after receiving the activation requirement by the cloud authentication server, the method further comprises: obtaining an activation identification corresponding to the username in the activation requirement, determining the activation identification; if the activation identification is that activation is done, returning a response indicating activated status back to the cloud authentication management platform, ending the procedure; if the activation identification is that activation is not confirmed, obtaining the stored activation code, executing Step 3; if the activation identification is that the activation is not done, allocating a token sequence number to the username in the activation requirement, generating a seed generating factor, obtaining the server seed key upon the seed generating factor, associating the server seed key to the username and storing the server seed key, executing Step S2;

Step S2 further comprises setting the activation identification as that activation is not confirmed; and in Step T3, returning a response of successful activation back to the client terminal further comprises setting the activation identification to be activated status.

Preferably, Step T2 specifically comprises:

Step T2-1, receiving, by the client terminal, the user name, a password and the dynamic password which are input by a user;

Step T2-2, determining, by the client terminal, whether the received username and the password are correct, if yes, execute Step T2-3; otherwise, reporting error, then ending the procedure; and Step T2-3, sending, by the client terminal, the user name and the dynamic password to the cloud authentication server.

Preferably, obtaining, by the cloud authentication server, a server seed key upon the seed generating factor, associating the server seed key to the username and storing the server seed key specifically comprises:

Step c1, performing, by the cloud authentication server, derivation on the seed generating factor by using a preset derivation algorithm to obtain the server seed key; and Step c2, obtaining, by the cloud authentication server, a corresponding enterprise key upon the username, encrypting the server seed key with the enterprise key, obtaining an encrypted server seed key, associating the encrypted server seed key to the username and storing the encrypted server seed key.

Preferably, before Step c2, the method further comprises:

Step d1, receiving, by a key operation and maintenance platform, an administrator key of a key holder;

Step d2, performing, by the key operation and maintenance platform, a preset operation on the administrator key to obtain a master key, storing the master key;

Step d3, obtaining, by the cloud authentication server, the master key from the key operation and maintenance platform regularly, determining whether the obtained master key and the stored master key are identical, if yes, executing Step d4; otherwise, updating the stored master key with the obtained master key, executing Step d4; and Step d4, obtaining, by the cloud authentication server, a corresponding enterprise ID upon the user name, performing hash operation on the master key and the enterprise ID to obtain the enterprise key, associating the enterprise key to the username and storing the enterprise key.

Preferably, in Step T3, obtaining a corresponding server seed key upon the username, generating a dynamic password upon the server seed key specifically comprises:

Step T3-1, obtaining, by the cloud authentication server, the corresponding enterprise key and the encrypted server seed key upon the user name;

Step T3-2, decrypting, by the cloud authentication server, the encrypted server seed key with a preset decryption algorithm to obtain the server seed key upon the enterprise key; and Step T3-3, generating, by the cloud authentication server, the dynamic password by using a password generating algorithm upon the server seed key.

Preferably, before receiving, by a cloud authentication server, an activation requirement of the cloud authentication management platform, the method further comprises:

Step a1, waiting, by the cloud authentication management platform, for a user record required to be activated which is selected by an administrator;

Step a2, generating, by the cloud authentication management platform, the activation requirement upon a username in the user record; and Step a3, sending, by the cloud authentication management platform, the activation requirement to the cloud authentication server.

Preferably, between Step a1 and Step a2, the method further comprises: upon the user record, determining, by the cloud authentication platform, whether a corresponding mobile terminal number, a corresponding mail account and a corresponding username are obtained, if yes, executing Step a2; otherwise, prompting that information is not complete; then procedure is ended.

Preferably, in Step S4, sending, by the cloud authentication managing platform, the two-dimensional code image to the client terminal specifically comprises: upon the mail account stored in the user record selected by the administrator, sending, by the cloud authentication platform, the two-dimensional code image to the mail platform of the client terminal via the mail.

Preferably, before Step a1, the method further comprises:

Step b0, setting, by the cloud authentication platform, failed times of authenticating password as an initial value;

Step b1, inputting, by the cloud authentication platform, an administrator account and a password which are input by the administrator;

Step b2, determining, by the cloud authentication platform, the administrator account and the password which are input by the administrator are correct, if yes, executing Step a1; otherwise, executing Step b3; and Step b3, updating, by the cloud authentication platform, the failed times of authenticating password, determining whether the updated failed times of authenticating password reaches a preset times, if yes, reporting error and locking the cloud authentication management platform; otherwise, going back to Step b1.

Preferably, between Step a1 and Step a2, the method further comprises: receiving, by the cloud authentication platform, an activation button clicked by the administrator, obtaining last activation time and a current system time, determining whether a different between the current system time and the last activation time is more than a preset time length, if yes, permitting re-activating and executing Step a2; otherwise, returning a response that activation is done; the procedure is ended;

Step a2 specifically comprises: generating, by the cloud authentication management platform, the activation requirement upon the username and a preset re-activating flag.

Preferably, Step S1 specifically comprises: after receiving the activation requirement from the cloud authentication management platform, determining, by the cloud authentication server, whether the preset reactivating flag is in the activation requirement, if yes, generating the seed generating factor, obtaining the server seed key upon the seed generating factor, associating the server seed key to the username and storing the server seed key; otherwise, allocating the token sequence number to the username in the activation requirement and generating the seed generating factor, obtaining the server seed key upon the seed generating factor, associating the server seed key to the username and storing the server seed key.

Preferably, allocating the token sequence number to the username in the activation requirement specifically comprises: generating, by the cloud authentication server, the token sequence number upon a method of generating token sequence number, associating the token sequence number to the username and storing the token sequence number.

Preferably, in Step S1, generating the seed generating factor specifically comprises: generating, by the cloud authentication server, a first random number by invoking a random number generating algorithm, taking the first random number as the seed generating factor;

in Step S3, generating the activation authentication code specifically comprises: generating a second random number by invoking the random number generating algorithm and taking the second random number as the activation authentication code.

In Step S4, generating the two-dimensional cod image upon the activation code specifically comprises: generating, by the cloud authentication management platform, the two-dimensional code image upon the encrypted activation code by invoking a two-dimensional code image generating function.

Preferably, Step S4 further comprises: sending, by the cloud authentication management platform, the encrypted activation code to the client terminal;

Step S5 further comprises: displaying, by the client terminal, the encrypted activation code; and Step S6 further comprises: receiving, by the mobile terminal token, the encrypted activation code and the activation authentication code which are input by the user, decrypting the encrypted activation code upon the activation authentication code to obtain the activation code.

Preferably, Step S2 specifically comprises: connecting, by the cloud authentication server, the token sequence number and the seed generating factor orderly to obtain the activation code upon a preset connecting and combining method.

Preferably, connecting the token sequence number and the seed generating factor orderly to obtain the activation code specifically comprises:

determining, by the mobile terminal token, whether requires receiving a short message authentication code, if yes, setting the first digit of the activation code to be 1; if no, setting the first digit of the activation code to be 0;

determining the password generating algorithm, if the password generating algorithm is a first preset algorithm, setting the second digit of the activation code to be 1; if the password generating algorithm is a second preset algorithm, setting the second digit of the activation code to be 0;

setting data from the third digit to the twelfth digit of the activation code to be the seed generating factor;

setting data from the thirteenth digit to the twenty-second digit of the activation code to be the token sequence number;

checking the seed generating factor to obtain a first checking value, setting the twenty-third digit of the activation code to be a first checking value;

performing checking calculation on the data from the first digit to the twenty-third digit of the activation code to obtain a second checking value, setting the twenty-fourth digit of the activation code to be the second checking value;

setting the twenty-fifth digit of the activation code to be a preset filling digit and setting the twenty-fifth digit to be 0.

Preferably, in Step S7, obtaining the seed generating factor and the token sequence number in the activation code specifically comprises: decomposing, by the mobile terminal token, the activation code to obtain the seed generating factor and the token sequence number upon a preset decomposing way, Preferably, decomposing, by the mobile terminal token, the activation code to obtain the seed generating factor and the token sequence number upon a preset decomposing way specifically comprises: obtaining and taking, by the mobile terminal token, data from the third digit to the twelfth digit in the activation code as the seed generating factor, taking data from the thirteenth digit to the twenty-second digit in the activation code as the token sequence number.

Preferably, in Step S3, encrypting the activation code with the activation authentication code to obtain an encrypted activation code further comprises: obtaining, by the cloud authentication server, a corresponding mobile terminal number upon the username, and using the mobile terminal number and the activation authentication code to encrypt the activation code to obtain the encrypted activation code;

in Step S6, decrypting the encrypted activation code with the activation authentication code to obtain the activation code further comprises: obtaining, by the mobile terminal token, the mobile terminal number, decrypting the encrypted activation code to obtain the activation code.

Preferably, in Step S3, encrypting the activation code with the activation authentication code to obtain the encrypted activation code further comprises: obtaining, by the cloud authentication server, pre-stored mobile terminal characteristic data, using the mobile terminal characteristic data and the activation authentication code to encrypt the activation code to obtain the encrypted activation code;

in Step S6, decrypting the encrypted activation code with the activation authentication code to obtain the activation code further comprises:

obtaining, by the mobile terminal token, the mobile terminal characteristic data, encrypting the encrypted activation code upon the mobile terminal characteristic data and the activation authentication code to obtain the activation code.

Preferably, in Step S2, generating the activation code upon the token sequence number and the seed further comprises: obtaining, by the cloud authentication server, a corresponding mobile terminal number upon the username, generating the activation code upon the token sequence number, the seed generating factor and the mobile terminal number;

before Step S7, the method further comprises: discomposing, by the mobile terminal token, the activation code to obtain the mobile terminal number, intercepting the mobile terminal number, determining whether the mobile terminal number in the activation code matches the intercepted mobile terminal number, if yes, executing Step S7; otherwise, prompting information that the present machine is not matched for activation, ending the procedure.

Preferably, in Step S2, generating the activation code upon the token sequence number and the seed further comprises: obtaining, by the cloud authentication server, corresponding mobile terminal characteristic data upon the username, and generating the activation code upon the token sequence number, the seed generating factor and the mobile terminal characteristic data;

before Step S7, the method further comprises: decomposing, by the mobile terminal token, the activation code to obtain the mobile terminal characteristic data, obtaining mobile terminal characteristic data of a present machine, determining whether the mobile terminal characteristic data obtained from the activation code matches the obtained mobile terminal characteristic data, if yes, executing Step S7; otherwise prompting information that the present machine is not matched for activation, ending the procedure.

Upon the present invention, the mobile terminal can activate the mobile terminal token even in the case of offline status without network, which is used widely. In addition, re-activating the mobile terminal token is permitted in such a way that the seed key input into the mobile terminal token can be different. The seed key of the server terminal and the seed key input into the mobile terminal token are encrypted and stored, which assures correct of the seed so as to enhance the security of the mobile terminal token.

DETAILED DESCRIPTION OF THE INVENTION

The technical solutions of the embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those skilled in the art without any creative work belong to the scope of the disclosure.

The present invention provides a method for activating a mobile terminal token, which includes an activating process and a process of authenticating a password for the first time and applies in a system including a terminal and a server. In this case, the server includes a cloud authentication managing platform and a cloud authentication server; the terminal includes a client terminal and a mobile terminal; the client terminal is a device, which can receive mail, such as a host PC or a tablet computer, etc.; the mobile terminal can be a device such as a mobile phone, a tablet computer, etc.; the mobile terminal token is an application in the mobile phone.

The activating process of the present invention is triggered by an administrator of the cloud authentication management platform; authenticating the password for the first time is completed by triggering of a user of the client terminal.

Embodiment 1

Figure 1:
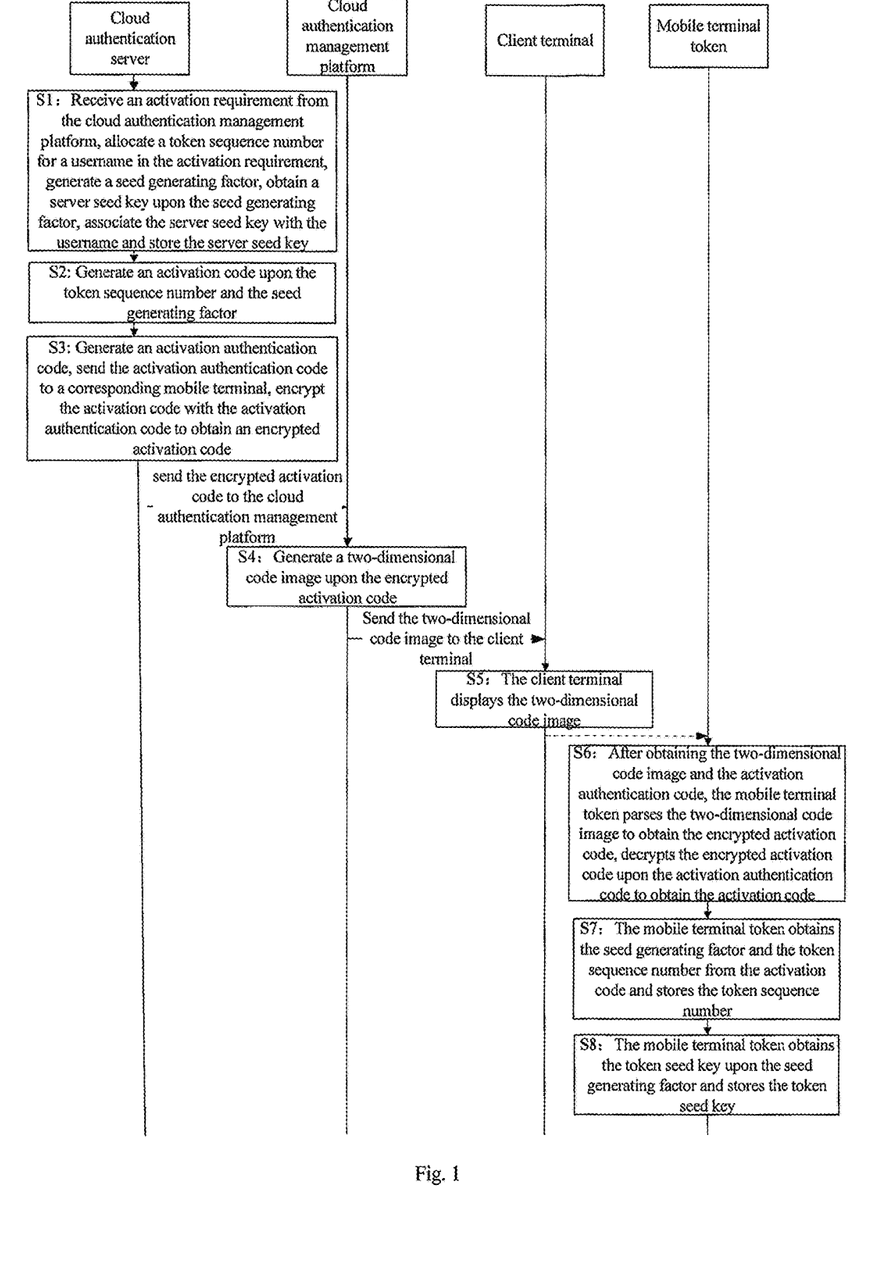
FIG. 1 is a flow chart of an activation process in Embodiment 1 of a method for activating a mobile terminal token.

Embodiment 1 of the present invention provides a method for activating a mobile terminal token, which is applied in the system including the cloud authentication management platform, the cloud authentication server, the client terminal and the mobile terminal token; as shown in FIG. 1, the method includes following steps.

Step S1, the cloud authentication server receives an activation requirement from the cloud authentication management platform, allocates a token sequence number for a username in the activation requirement, generates a seed generating factor, obtains a server seed key upon the seed generating factor, associates the server seed key with the username and stores the server seed key;

Step S2, the cloud authentication server generates an activation code upon the token sequence number and the seed generating factor;

Step S3, the cloud authentication server generates an activation authentication code, sends the activation authentication code to a corresponding mobile terminal, encrypts the activation code with the activation authentication code to obtain an encrypted activation code, sends the encrypted activation code to the cloud authentication management platform;

Step S4, the cloud authentication management platform generates a two-dimensional code image upon the encrypted activation code and sends the two-dimensional code image to the client terminal;

Step S5, the client terminal displays the two-dimensional code image;

Step S6, after obtaining the two-dimensional code image and the activation authentication code, the mobile terminal token parses the two-dimensional code image to obtain the encrypted activation code, decrypts the encrypted activation code upon the activation authentication code to obtain the activation code;

Step S7, the mobile terminal token obtains the seed generating factor and the token sequence number from the activation code and stores the token sequence number; and Step S8, the mobile terminal token obtains the token seed key upon the seed generating factor and stores the token seed key.

In Embodiment 1, the server seed key and the token seed key is stored after being encrypted or is stored directly.

In Embodiment 1, after Step S8, the method further includes following steps.

Step T1, the mobile terminal token generates a dynamic password upon the token seed key and displays the dynamic password;

Step T2, the client terminal receives a username and the dynamic password which are input by the user, sends the username and the dynamic password to the cloud authentication server; and Step T3, the cloud authentication server obtains the corresponding server seed key upon the username, generates the dynamic password upon the server seed key, determines whether the generated dynamic password matches the received dynamic password, if yes, return a response that authentication is successful to the client terminal, the procedure is ended; otherwise, return a response that authentication is failed to the client terminal, the procedure is ended.

Embodiment 2

Figure 2:
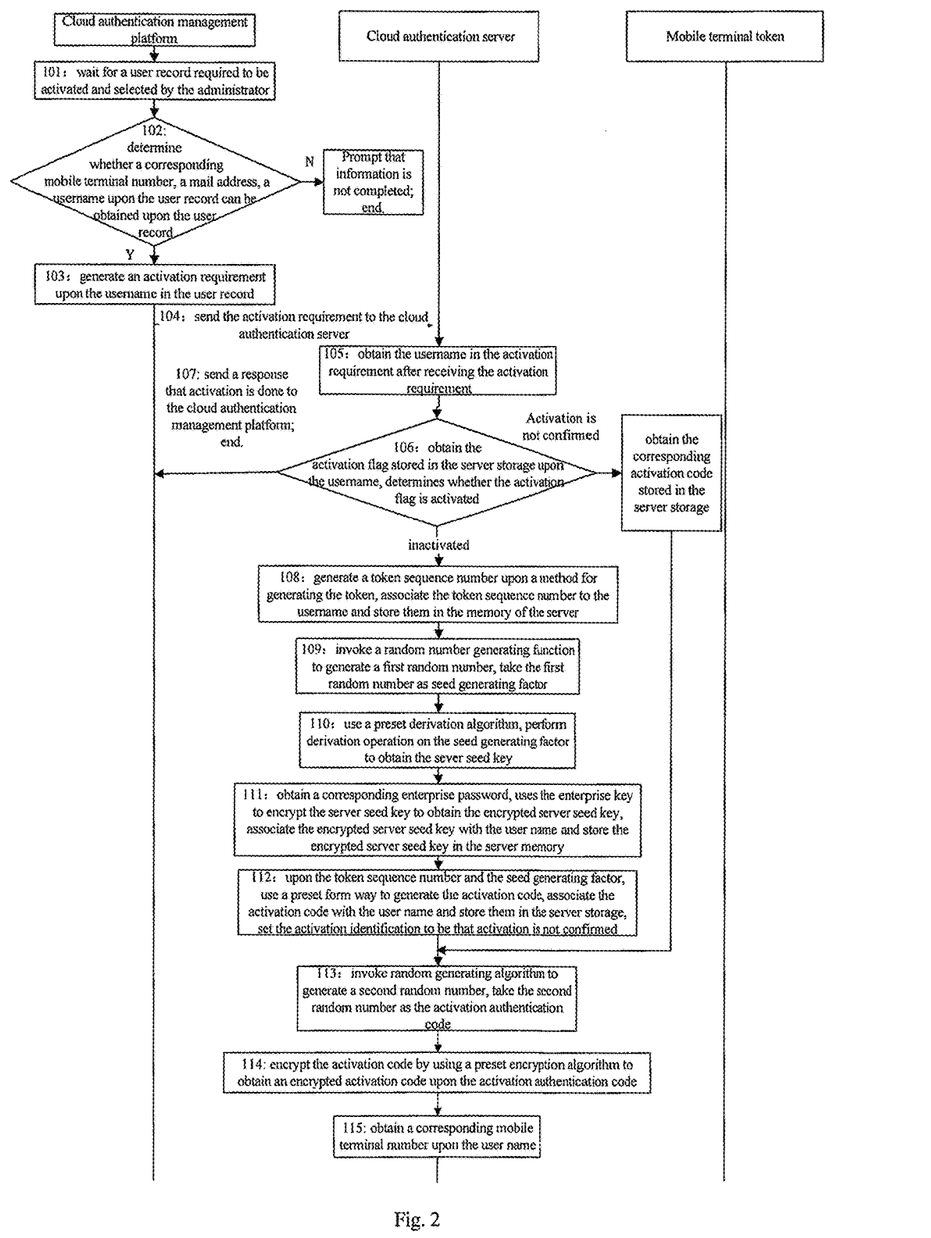
FIG. 2 and FIG. 3 are flow charts of an activation process in Embodiment 2 of a method for activating a mobile terminal token.
Figure 3:
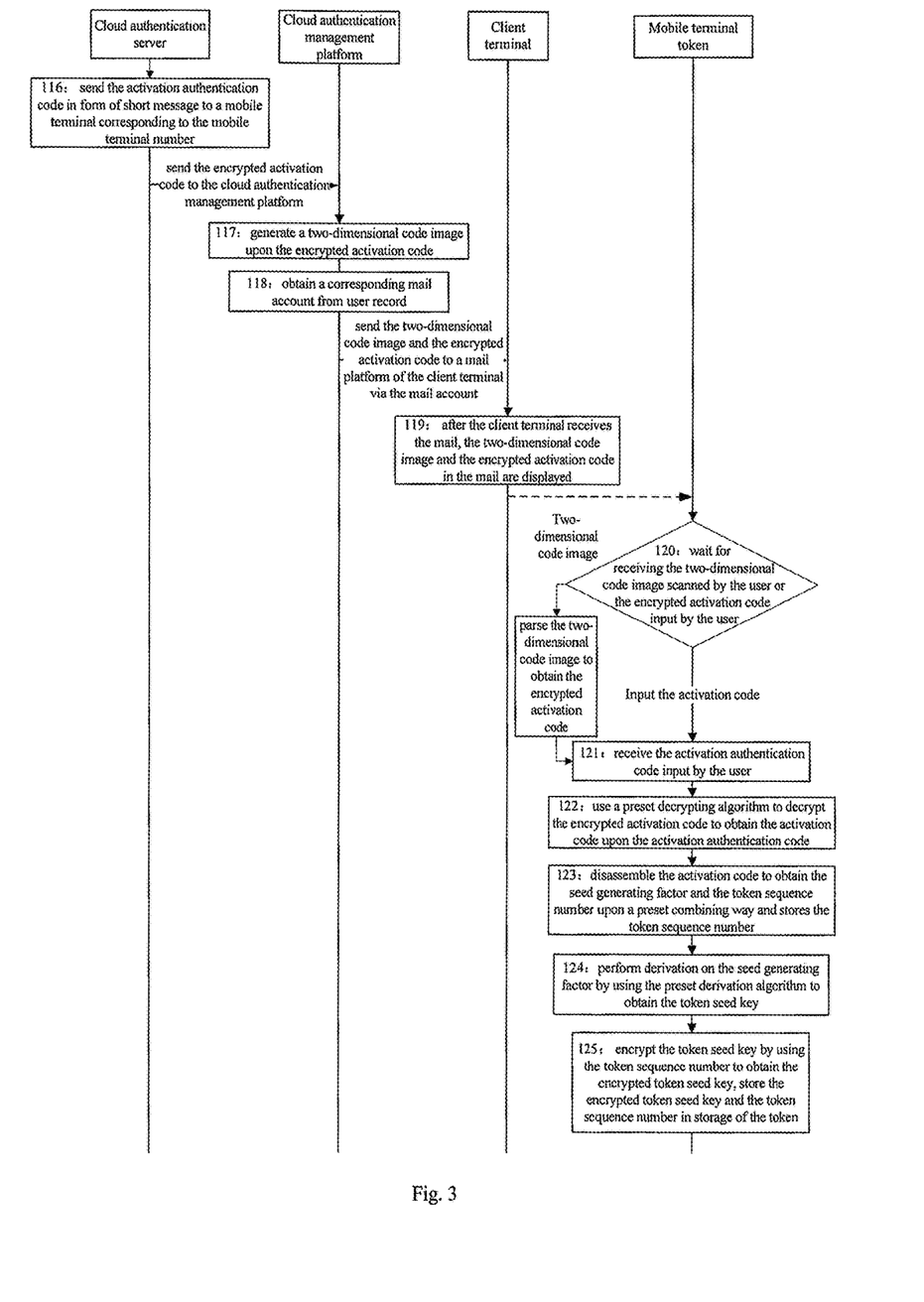

Embodiment 2 of the present invention provides a method for activating a mobile terminal token, which includes a activation process and a process of authentication for the first time. As shown in FIG. 2 and FIG. 3, the method includes following details.

In Embodiment 2, the activation process is applied in the system including the cloud authentication management platform, the client terminal, the cloud authentication server, and the mobile terminal token; a plurality of groups of user records are registered at the cloud authentication management platform in advance; the activation process specifically includes following steps.

Step 101, the cloud authentication management platform waits for a user record selected by the administrator, which is required to be activated.

In Embodiment 2, before Step 101, the method further includes following steps:

A) the cloud authentication management platform sets an initial value of failure times for authenticating password as 0;

B) the cloud authentication management platform waits for receiving an administrator account number and a password which are input by the administrator;

C) the cloud authentication management platform determines whether the administrator account number and the password which are input by the administrator are correct, if yes, execute Step 101; otherwise, execute Step D; and D) the cloud authentication management platform updates failure times for authenticating password, determines whether the updated failure times for authenticating password reaches a preset times, if yes, report error and lock the cloud authentication management platform; otherwise, go back to Step B;

further, a way for administrator authentication can be configured in advance, i.e. authenticating account password is used or two factor authentication is configured;

in this case, the two factor authentication process includes: authenticating an account password at first, when the account password is matched, displaying a button for obtaining a short message password and an input box for inputting the short message password; after the administrator clicks the button for obtaining a short message password, waiting for the administrator to input the short message password; after receiving the short message password, determining whether the short message password is correct, if yes, log on successfully, execute Step 101; otherwise, accumulating times for authenticating short message password; when the times, which preferably is 10, for authenticating short message password reaches a preset times, locking the cloud authentication management platform temporarily, unlocking automatically after a regular preset time, which preferably is 30 minutes.

Step 102, the cloud authentication management platform determines whether a corresponding mobile terminal number, a mail address, a username upon the user record can be obtained upon the user record, if yes, execute Step 103; otherwise, prompts that prompting information is not completed, procedure is ended;

In Embodiment 2, the user record includes the username, the mobile terminal number, the mail address, etc.;

for example, the user record selected by the administrator received by the cloud authentication management platform is as the following:

username: abc
user mail address: 123456789@126.com
mobile terminal number: 18912345678 in this case, the cloud authentication management platform can determines that the username has bonded to the mobile terminal token upon the obtained mobile terminal number.

Step 103, the cloud authentication management platform generates an activation requirement upon the username in the user record.

Before Step 103, the method further includes that the cloud authentication management platform receives the activation button clicked by the administrator, the cloud authentication management platform obtains last activation time, determines whether a different between a current system time and the last activation time is more than a preset time, if yes, re-activation is permitted and Step 103 is executed; otherwise a response which indicating that activation is done is return, the procedure is ended;

in this case, if re-activation is permitted, the cloud authentication management platform generates an activation requirement with a preset re-activation flag upon the username in the user record; if the activation is for the first time, the cloud authentication management generates the activation requirement upon the username alone.

Step 104, the cloud authentication management platform sends the activation requirement to the cloud authentication server.

Step 105, the cloud authentication management obtains the username in the activation requirement after receiving the activation requirement.

In Embodiment 2, the data stored in storage of the authentication server includes username, activation flag, mobile terminal number, mobile terminal characteristic data, the encryption seed key, the token sequence number and the enterprise key, etc., which are in relation of one-to-one correspondence.

Step 106, the cloud authentication server obtains the activation flag stored in the server storage upon the username, determines whether the activation flag is activated, if yes, execute Step 107; if activation is not confirmed, obtain the corresponding activation code stored in the server storage and execute Step 113; if no, execute Step 108;

Preferably, when the activation flag is 0, the activation flag is not activated; when the activation flag is 1, whether the activation flag is activated is not confirmed; when the activation flag is 2, the activation flag is activated.

In Embodiment 2, before Step 106, the method further includes that the cloud authentication server determines whether a preset re-activation flag can be obtained, if yes, re-generating a token sequence number is not required and the username in the activation requirement is obtained, then Step 109 is executed; otherwise, execute Step 106.

Step 107, the cloud authentication server sends a response that activation is done to the cloud authentication management platform, the procedure is ended.

Step 108, the cloud authentication server generates a token sequence number upon a method for generating the token, associates the token sequence number to the username and stores them in the memory of the server.

In Embodiment 2, preferably, an OTP cloud authentication center generates a token sequence number with length of 10 digits upon generating sequence of the token sequence number.

In this case, preferably, the method for generating the token sequence number specifically includes: upon generating sequence of the token sequence number, generating a token sequence number by adding 1 from 0000000001, for example, the activated token sequence number is 1000000000, the token sequence number generated this time is 1000000001.

Step 109, the cloud authentication server invokes a random number generating function to generate a first random number, takes the first random number as seed generating factor;

in Embodiment 2, preferably, the OTP cloud authentication center invokes the random number generating function Random.nextInt(10) to generate a first random number, which is decimal data with length of 10 digits, and takes the first random number as the seed generating factor;

for example, the cloud authentication server generates the first random number, which is the seed generating factor of 6595781253.

Step 110, the cloud authentication server uses a preset derivation algorithm, performs derivation operation on the seed generating factor to obtain the sever seed key.

in Embodiment 2, preferably, the OTP cloud authentication center uses PBKDF2 derivation algorithm to obtain the server seed key of 20 bytes. Besides, BF derivation algorithm, etc. can be used.

For example, the first random number generated by the OTP cloud authentication center, which is the seed generating factor, is 6595781253; by performing derivation on the seed generating factor, the server seed key is obtained, which is FB80ECDA5EDF464CF7715EE66A25ED079122D429.

Step 111, the cloud authentication server obtains a corresponding enterprise password, uses the enterprise key to encrypt the server seed key to obtain the encrypted server seed key, associates the encrypted server seed key with the user name and stores the encrypted server seed key in the server memory.

Specifically, the OTP cloud authentication center encrypts the server seed key with a preset encryption algorithm to obtain a binary encrypted server seed key, then transforms the binary encrypted server seed key according to Base64 to obtain a character string; preferably, the preset encryption algorithm is 3DES algorithm; In addition, the preset encryption algorithm can be DES, RSA, etc.

For example, the enterprise key obtained by the OTP cloud authentication center is 1F3D4E3A12459372B837193177913782, the encrypted server seed key obtained by encrypting the server seed key with the enterprise key and transforming is PL96EUSWSdPP2gj8fr6m-YXBpLWE0OTJjN2Q3LmR1b3N1Y3VyaXR5LmNvbQ.

Before Step 111, the method further includes:

Step 1, a key operation and maintenance platform receives an administrator key of a key holder;

in this case, in order to assure security of the administrator key of the key holder, the administrator key of the key holder is required to be changed regularly;

Step 2, the key operation and maintenance platform performs a preset operation on the administrator key to obtain a master key, stores the master key in a memory;

Step 3, the cloud authentication server obtains the master key from the key operation and maintenance platform regularly, determines whether the obtained master key and the master key stored in the server storage are identical, if yes, execute Step 4; otherwise, updates the master key stored in the server storage, execute Step 4;

in Embodiment 2, because the administrator key requires to be changed regularly, preferably, the cloud authentication server sends a requirement for obtaining the master key to the key operation and maintenance platform every 2 minutes, receives a current master key returned by the key operation and maintenance platform;

Step 4, the cloud authentication server obtains a corresponding enterprise ID upon the user name, performing hash operation on the master key and the enterprise ID to obtain the enterprise key, stores the enterprise key to the server storage;

in this case, the enterprise ID is allocated randomly by the cloud authentication management platform and associated with a plurality of the username an stored in the server storage when the administrator is registered;

in Embodiment 2, because the server seed key is encrypted with the enterprise ID, when a server seed key is cracked, the server seed keys of other enterprises can not be cracked at the same time, which has better security.

Step 112, upon the token sequence number and the seed generating factor, the cloud authentication server uses a preset form way to generate the activation code, associates the activation code with the user name and stores them in the server storage, sets the activation identification to be that activation is not confirmed;

in Embodiment 2, upon the token sequence number and the seed generating factor, using the preset activation code form way to generate the activation code specifically includes performing preset combination on the token sequence number and the seed generating factor to obtain the activation code;

preferably, the activation code generated by using the preset form way is made up of 25 digits number:

in this case, performing preset combination on the token sequence number and the seed generating factor to obtain the activation code is specifically includes:

1. determining whether the mobile terminal token requires to receive a short message authentication code, if yes, setting the first digit of the activation code to be 1, if no, setting the first digit of the activation code to be 0;

2. determining a password generating algorithm, if the password generating algorithm is a first preset algorithm, setting the second digit of the activation code as 1; if the password generating algorithm is a second preset algorithm, setting the second digit of the activation code as 0;

3. setting the data from the third digit to the twelfth digit as the seed generating factor;

4. setting the data from the thirteenth digit to the twenty-second digit of the activation code as the token sequence number;

5. checking the seed generating factor to obtain a first check value, setting the data of the twentieth-third digit of the activation code as the first check value;

6. performing check calculation on the first twenty-three digits of the activation code to obtain a second check value, setting the twenty-fourth digit of the activation code as the second check value; and 7. taking data of the twenty-fifth bit of the activation code as a preset filling bit which is set as 0;

for example, upon the token sequence number and the seed generating factor, the activation code with 25 digits is generated by a preset activation code form way is 1165957812531000000001350;

in addition, in Embodiment 2 generating the activation code by using the preset form way further includes:

in this case, the first digit identifies whether short message authentication code is required for activating the terminal token, if yes, setting the first digit as 1; if no, setting the first digit as 0;

the second digit identifies dynamic password generating algorithm, if SM3 algorithm is used, setting the second digit as 0, if international AUTH algorithm is used, the second digit is set as 1;

the data from the third digit to the twelfth digit represent the seed generating factor;

the data from the thirteenth digit to the twenty-second digit represent the token sequence number;

the data from the twenty-third digit to the twenty-eighth digit is the last six digits of the mobile terminal number, or the mobile terminal characteristic data is obtained, the data of a preset length of the mobile terminal characteristic data is obtained, the twenty-third digit to the twenty eighth digit of the activation code is set;

the twenty-ninth digit is the check value obtained by performing check calculation on the seed generating factor;

the thirtieth digit is the check value obtained by performing check calculation on the twenty-ninth digit; and the thirty-first digit is the preset filling digit and is set as 0.

Step 113, the cloud authentication server invokes random generating algorithm to generate a second random number, takes the second random number as the activation authentication code;

preferably, OTP cloud authentication center invokes random number generating algorithm Random.nextInt(6) to generate decimal data with 6 digits as the activation authentication;

for example, the OTP cloud authentication center generates the second random number with 6 digits, i.e. the activation authentication code is 551896.

Step 114, the cloud authentication server encrypts the activation code by using a preset encryption algorithm to obtain an encrypted activation code upon the activation authentication code;

in Embodiment 2, the OTP cloud authentication center replaces the activation code with the activation authentication code to obtain the encrypted activation code not in order, preferably, the preset encryption algorithm is 3DES algorithm, besides, the preset encryption algorithm can be DES algorithm, RSA algorithm, etc.

Preferably, Step 114 further can be that the cloud authentication server obtains the corresponding mobile terminal number upon the user name, the sixth digits after the mobile terminal number and the activation authentication are used to encrypt the activation code to obtain the encrypted activation code;

further, the method includes: when registering a user at the cloud authentication management platform, mobile terminal characteristic data, such as Bluetooth mac address, default random number or internal version number in the mobile terminal, is required to be input by the user in advance;

for example, the OTP cloud authentication center uses 3DES algorithm to encrypt the activation code to obtain the encrypted activation code which is 2531000000001116595781350.

Step 115, the cloud authentication server obtains a corresponding mobile terminal number upon the user name.

Step 116, the cloud authentication server sends the activation authentication code in form of short message to a mobile terminal corresponding to the mobile terminal number, sends the encrypted activation code to the cloud authentication management platform.

Step 117, the cloud authentication management platform generates a two-dimensional code image upon the encrypted activation code;

specifically, the cloud authentication management platform invokes a two-dimensional code image generating function upon the encrypted activation code;

Step 118, the cloud authentication management platform obtains a corresponding mail account from user record, sends the two-dimensional code image and the encrypted activation code to a mail platform of the client terminal via the mail account.

Step 119, after the client terminal receives the mail, the two-dimensional code image and the encrypted activation code are displayed in the mail;

in Embodiment 2, because mobile terminals of some user do not have function of scanning two-dimension code, activation way of inputting the encrypted activation code directly by the user is provided in order to solve such problem.

Step 120, the mobile terminal token waits for receiving the two-dimensional code image scanned by the user or the encrypted activation code input by the user;

when the mobile terminal token receives the two-dimensional code image scanned by the user, the mobile terminal token parses the two-dimensional code image to obtain the encrypted activation code; Step 121 is executed;

specifically, the mobile terminal token invokes a two-dimensional code image parsing function to obtain the encrypted activation code 2531000000001116595781350;

when the mobile terminal token receives the encrypted activation code input by the user, Step 121 is executed;

specifically, the mobile terminal token receives the encrypted activation code of 2531000000001116595781350 input by the user.

Step 121, the mobile terminal token receives the activation authentication code input by the user;

specifically, the mobile terminal token receives the activation authentication code of 551896 input by the user.

Step 122, the mobile terminal token uses a preset decrypting algorithm to decrypt the encrypted activation code to obtain the activation code upon the activation authentication code;

in Embodiment 2, the mobile terminal token uses the activation authentication code to perform counter replacement on the activation code to obtain the activation code; preferably, the preset encryption algorithm is 3DES; in addition, the preset encryption algorithm can be DES, RSA, etc.;

the present Step 122 can also be that the mobile terminal token decrypts the encrypted activation code upon the activation authentication code and the last 6 digits of the mobile terminal number, decrypts the encrypted activation code, determines whether decrypts the encrypted activation code successfully, if yes, obtains the activation code by decryption; otherwise, prompts information that the mobile terminal is not matched activation mobile terminal; procedure is ended.

Further, in addition, the present step further includes that the mobile terminal token obtains mobile terminal characteristic data, decrypts the encrypted activation code with the mobile terminal characteristic data and the activation authentication code, determines whether decryption is successful, if yes, obtains the activation code by decryption; if no, prompts information that the mobile terminal is not matched activation mobile terminal; procedure is ended.

In Embodiment 2, the mobile terminal number and/or the mobile terminal characteristic data is added in process of generating the two-dimensional code image, therefore, one two-dimensional code image can only be scanned by a unique mobile terminal to obtain a seed key and other mobile terminal can not be used, which enhances security of offline activation;

for example, the mobile terminal token decrypts the encrypted activation code with 3DES upon the activation authentication code of 551896 to obtain the activation code of 1165957812531000000001350.

Step 123, the mobile terminal token disassembles the activation code to obtain the seed generating factor and the token sequence number upon a preset combining way and stores the token sequence number;

in Embodiment 2, that the mobile terminal token disassembles the activation code to obtain the seed generating factor upon the preset combining way specifically includes taking data from the third digit to the twelfth digit from the activation code as the seed generating factor; taking data from the thirteenth digit to the twenty-second digit as the token sequence number.

For example, the mobile terminal token disassembles the activation code to obtain the seed generating factor of 6595781253 upon a preset activation code combining way; the token sequence number obtained by disassembling the activation code is 1000000001.

In Embodiment 2, before Step 124 the method further includes obtaining data from the twenty-third digit to the twenty-eighth digit of the activation code and obtaining the mobile terminal number, determining whether data from twenty-third digit to the twenty-eighth digit of the activation code match the last sixth digits of the mobile terminal number, if yes, executing Step 124; otherwise, prompting information that the mobile terminal is not matched activation mobile terminal; procedure is ended; or, obtaining data from the twenty-third digit to the twenty-eighth digit of the activation data, obtaining the mobile terminal characteristic data, determining whether data from the twenty-third digit to the twenty-eight digit of the activation code matches the mobile terminal characteristic data, if yes, executing Step 124; otherwise, prompting information that the mobile terminal is not matched activation mobile terminal; procedure is ended.

Step 124, the mobile terminal token performs derivation on the seed generating factor by using the preset derivation algorithm to obtain the token seed key;

preferably, the mobile terminal token uses PBKDF2 derivation algorithm to obtain the token seed key with 20 bytes; in addition, the derivation algorithm can be BF derivation algorithm, etc.;

for example, the mobile terminal token performs derivation on the seed generating factor to obtain the token seed key of FB80ECDA5EDF464CF7715EE66A25ED079122D429.

Step 125, the mobile terminal token encrypts the token seed key by using the token sequence number to obtain the encrypted token seed key, stores the encrypted token seed key and the token sequence number in storage of the token.

Preferably, the password generating algorithm is OATH time type algorithm; in addition, the password generating algorithm can be state cryptography algorithm type algorithm, SM3 algorithm, etc.;

for example, the mobile terminal token generate a password of 6 digits, which is 651255, by using OATH time type algorithm upon the token seed key.

Figure 4:
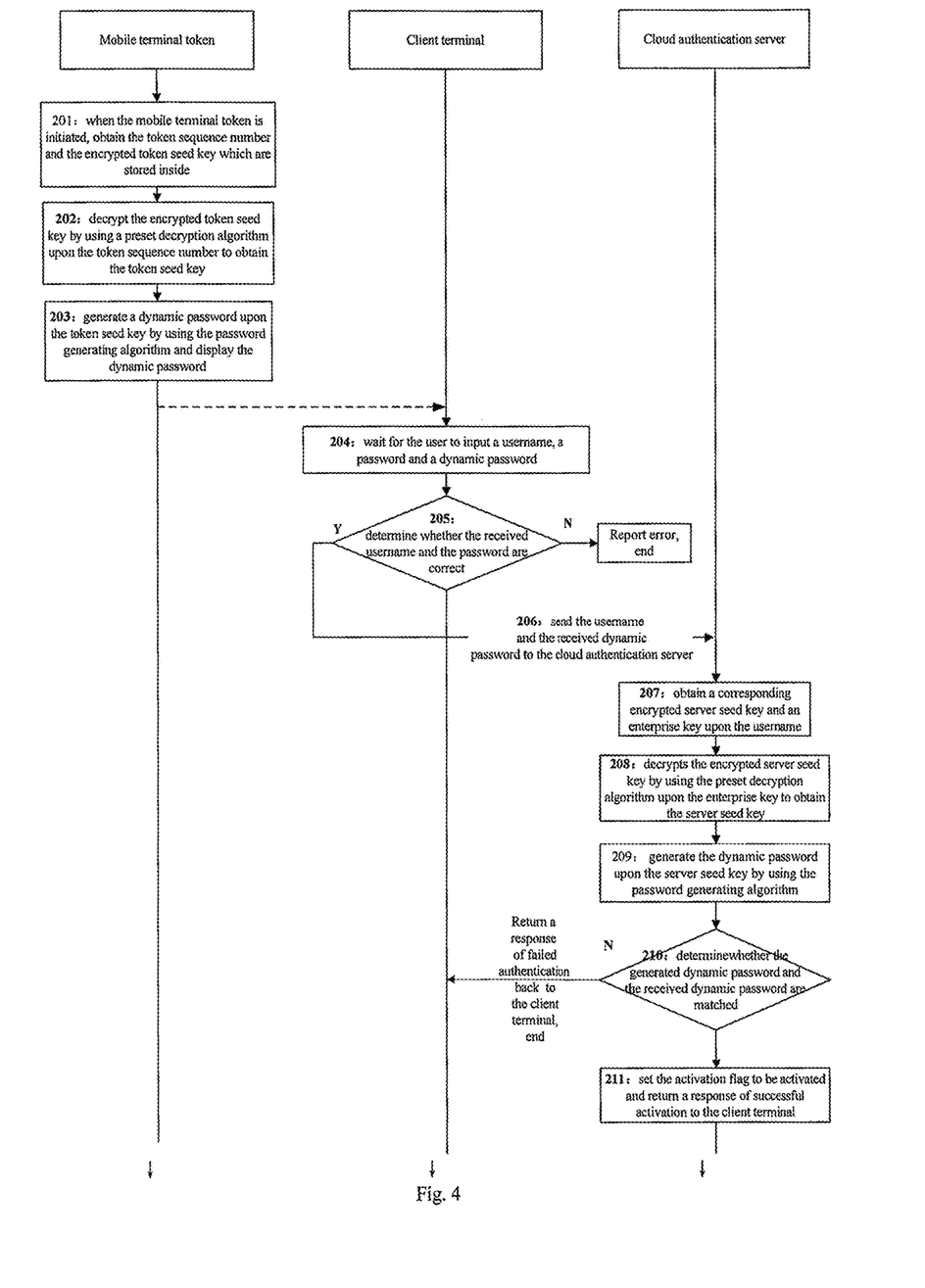
FIG. 4 is a flow chart for authenticating the password for the first time in Embodiment 2 of a method for activating a mobile terminal token.

As shown in FIG. 4, in Embodiment 2, process of authenticating a password for the first time is applied in the system including the cloud authentication server, the client terminal and the mobile terminal token; the method includes that when the client terminal initiates an application requires authenticating the dynamic password, the client terminal displays a box for inputting username, password and dynamic password and following operation is performed.

Step 201, when the mobile terminal token is initiated, the token sequence number and the encrypted token seed key which are stored inside is obtained;

for example, the mobile terminal token obtains the token sequence number is 1000000001, the encrypted seed key is
PL96EUSWSdPP2gj8fr6m-
YXBpLWE0OTJjN2Q3LmR1b3N1Y3VyaXR5LmNvbQ.

Step 202, the mobile terminal token decrypts the encrypted token seed key by using a preset decryption algorithm upon the token sequence number to obtain the token seed key.

Specifically, the mobile terminal token decrypts the encrypted token seed key by using a preset decrypting algorithm upon the token sequence number to obtain the token seed key, then converts the token seed key upon Base64 to obtain a character string; preferably, the preset decryption algorithm is 3DES, or the preset decryption algorithm can be DES, RSA, etc.;

for example, the mobile terminal token decrypts the encrypted activation code upon the token sequence number to obtain the token seed key of FB80ECDA5EDF464CF7715EE66A25ED079122D429.

Step 203, the mobile terminal token generates a dynamic password upon the token seed key by using the password generating algorithm and displays the dynamic password;

for example, the mobile terminal token generates dynamic password of 569145 upon the token seed key of FB80ECDA5EDF464CF771 5EE66A25ED079122D429 and the password generating algorithm of SM3 algorithm.

Step 204, the client terminal waits for the user to input a username, a password and a dynamic password;

for example, the username of ft, the password of 123, the dynamic password of 569145 are revived by the client terminal.

Step 205, the client terminal determines whether the received username and the password are correct, if yes, Step 206 is executed; otherwise, error is reported, procedure is ended;

in this case, when the client side authenticates that the username and the password are not correct, the method further includes determining whether times for authenticating username and password reaches a preset times, preferably, which is 3 times, if yes, the client terminal application is locked; otherwise, go back to Step 204.

Step 206, the client terminal sends the username and the received dynamic password to the cloud authentication server;

for example, the client terminal sends the username of ft and the dynamic password of 569145 to the cloud authentication server.

Step 207, the cloud authentication server obtains a corresponding encrypted server seed key and an enterprise key upon the username;

for example, the corresponding encrypted seed server key obtained by the cloud authentication server upon the username of ft is PL96EUSWSdPP2gj8fr6m-YXBpLWE0OTJjN2Q3LmR1b3N1Y 3VyaXR5LmNvbQ; the obtained enterprise key is 1F3D4E3A12459372B837 193177913782.

Step 208, the cloud authentication server decrypts the encrypted server seed key by using the preset decryption algorithm upon the enterprise key to obtain the server seed key;

in this case, preferably, the preset decryption algorithm is 3DES; in addition, the preset decryption algorithm can be DES, RSA, etc.;

for example, the cloud authentication server decrypts the encrypted server seed key by using the enterprise key to obtain the server seed key of
FB80ECDA5EDF464CF7715EE66A25ED
079122D429.

Step 209, the cloud authentication server generates the dynamic password upon the server seed key by using the password generating algorithm;

for example, the cloud authentication server generates a dynamic password window, which includes dynamic password of 569145, upon the server seed key.

Step 210, the cloud authentication server determines whether the generated dynamic password and the received dynamic password are matched, if yes, Step 211 is executed; otherwise, a response of failed authentication is returned back to the client terminal, the procedure is ended;

in the present Step 210, when the cloud authentication server returns a response that password is error to the client terminal, the client terminal displays that password is error; if the times for inputting error password to the client terminal by the user reaches a preset value, the client terminal prompts the user to contact the administrator for re-activating.

Step 211, the cloud authentication server sets the activation flag to be activated and returns a response of successful activation to the client terminal, the procedure is ended;

in the present Step 211, when the cloud authentication server returns the response of successful activation to the client terminal, the client terminal displays information of successful activation.

What described above is only specific preferred embodiments of the present invention. However, the scope of protection of the present invention is not limited to the embodiments of the present invention, any change or substitution which is easily though of should fall in the scope of protection of the present invention. Therefore, the scope of protection of the present invention should be defined by the appended claims.

The invention claimed is:

1. A method for activating a mobile terminal token, wherein said method comprises:
   step S1, receiving, by a cloud authentication server, an activation requirement from a cloud authentication management platform, allocating a token sequence number to a username in the activation requirement, generating a seed generating factor, obtaining a server seed key according to the seed generating factor, associating the server seed key to the username, and storing the server seed key;
   step S2, generating, by the cloud authentication server, an activation code according to the token sequence number and the seed generating factor, and storing the activation code;
   step S3, generating, by the cloud authentication server, an activation authentication code, sending the activation authentication code to a corresponding mobile terminal token, encrypting the activation code with the activation authentication code to obtain an encrypted activation code, and sending the encrypted activation code to the cloud authentication management platform;
   step S4, generating, by the cloud authentication management platform, a two-dimensional code image according to the encrypted activation code, and sending the two-dimensional code to a client terminal;
   step S5, displaying, by the client terminal, the two-dimensional code image;
   step S6, analyzing, by the mobile terminal token, the two-dimensional code image so as to obtain the encrypted activation code when the mobile terminal token obtains the two-dimensional code image and the activation authentication code, then decrypting the encrypted activation code according to the activation authentication code to obtain the activation code;
   step S7, obtaining, by the mobile terminal token, the seed generating factor and the token sequence number from the activation code, and storing the token sequence number; and
   step S8, obtaining, by the mobile terminal token, a token seed key according to the seed generating factor, and storing the token seed key; and then
   step T1, generating, by the mobile terminal token, a dynamic password according to the token seed key, and displaying the dynamic password;
   step T2, receiving, by the client terminal, a username and the dynamic password input by a user, sending the username and the dynamic password to the cloud authentication server; and step T3, obtaining, by the cloud authentication server, a corresponding server seed key according to the username, generating a dynamic password according to the server seed key, determining whether the generated dynamic password matches the received dynamic password; if yes, returning a response of successful authentication to the client terminal, then ending the procedure; otherwise, returning a response of failed authentication to the client terminal, then ending the procedure.

2. The method of claim 1, wherein step S8 specifically comprises:
   step S8-1, performing, by the mobile terminal token, derivation on the seed generating factor by using a preset derivation algorithm to obtain the token seed key; and
   step S8-2, encrypting, by the mobile terminal token, the token seed key with the token sequence number to obtain an encrypted token seed key, and storing the encrypted token seed key.

3. The method of claim 1, wherein step T1 specifically comprises:
   step T1-1, obtaining, by the mobile terminal token, the token sequence number and the encrypted token seed key which are stored inside, decrypting the encrypted token seed key with the token sequence number to obtain the token seed key; and
   step T1-2, generating, by the mobile terminal token, the dynamic password by performing operation on the token seed key and the dynamic factor with a password generating algorithm, and displaying the dynamic password.

4. The method of claim 1, wherein in step S1, after receiving the activation requirement by the cloud authentication server, the method further comprises: obtaining an activation identification corresponding to the username in the activation requirement, determining the activation identification; if the activation identification is that activation is done, returning a response indicating an activated status to the cloud authentication management platform, then ending the procedure; if the activation identification is that activation is not confirmed, obtaining the stored activation code, executing step 3; if the activation identification is that the activation is not done, allocating a token sequence number to the username in the activation requirement, generating a seed generating factor, obtaining the server seed key according to the seed generating factor, associating the server seed key to the username, and storing the server seed key, then executing step S2;
   step S2 further comprises setting the activation identification as that activation is not confirmed;
   in step T3, returning a successful response to the client terminal further comprises setting the activation identification to be the activated status.

5. The method of claim 1, wherein step T2 specifically comprises:
   step T2-1, receiving, by the client terminal, the user name, a password and the dynamic password which are input by the user;
   step T2-2, determining, by the client terminal, whether the received username and the password are correct, if yes, executing step T2-3; otherwise, reporting error, then ending the procedure; and
   step T2-3, sending, by the client terminal, the user name and the dynamic password to the cloud authentication server.

6. The method of claim 1, wherein obtaining, by the cloud authentication server, a server seed key according to the seed generating factor, associating the server seed key to the username, and storing the server seed key specifically comprises:

step c1, performing, by the cloud authentication server, derivation on the seed generating factor by using a preset derivation algorithm to obtain the server seed key; and step c2, obtaining, by the cloud authentication server, a corresponding enterprise key according to the username, encrypting the server seed key with the enterprise key, obtaining an encrypted server seed key, associating the encrypted server seed key to the username, and storing the encrypted server seed key.

7. The method of claim 6, wherein after step c1 and before step c2, the method further comprises:

step d1, receiving, by a key operation and maintenance platform, an administrator key of a key holder;

step d2, performing, by the key operation and maintenance platform, a preset operation on the administrator key to obtain a master key, then storing the master key;

step d3, obtaining, by the cloud authentication server, the master key from the key operation and maintenance platform regularly, determining whether the obtained master key and the stored master key are identical, if yes, executing step d4; otherwise, updating the stored master key with the obtained master key, then executing step d4; and step d4, obtaining, by the cloud authentication server, a corresponding enterprise ID according to the user name, performing hash operation on the master key and the enterprise ID to obtain the enterprise key, associating the enterprise key to the username, and storing the enterprise key.

8. The method of claim 6, wherein, in step T3, obtaining a corresponding server seed key according to the username, and generating a dynamic password according to the server seed key specifically comprises:

step T3-1, obtaining, by the cloud authentication server, the corresponding enterprise key and the encrypted server seed key according to the user name;

step T3-2, decrypting, by the cloud authentication server, the encrypted server seed key with a preset decryption algorithm to obtain the server seed key according to the enterprise key; and step T3-3, generating, by the cloud authentication server, the dynamic password by using a password generating algorithm according to the server seed key.

9. The method of claim 1, wherein initially before step S1, receiving, by the cloud authentication server, the activation requirement of the cloud authentication management platform, the method further comprises:

step a1, waiting, by the cloud authentication management platform, for a user record required to be activated which is selected by an administrator;

step a2, generating, by the cloud authentication management platform, the activation requirement according to a username in the user record; and step a3, sending, by the cloud authentication management platform, the activation requirement to the cloud authentication server.

10. The method of claim 1, wherein allocating the token sequence number for the username in the activation requirement specifically comprises: generating, by the cloud authentication server, the token sequence number according to a token sequence number generating method, associating the token sequence number to the username, and storing the token sequence number.

11. The method for claim 1, wherein in step S1, generating the seed generating factor specifically comprises: invoking, by the cloud authentication server, a random number generating algorithm to generate a first random number, and taking the first random number as the seed generating factor; and in step S3, generating the activation authentication code specifically comprises: invoking, by the cloud authentication server, a random number generating algorithm to generate a second random number, and taking the second random number as the activation authentication code.

12. The method of claim 1, wherein in step S4, generating the two-dimensional image according to the encryption activation code specifically comprises: invoking, by the cloud authentication and management platform, the two-dimensional image generating function according to the encrypted activation code to generate the two-dimensional image.

13. The method of claim 1, wherein step S4 further comprises: sending, by the cloud authentication management platform, the encrypted activation code to the client terminal;

step S5 further comprises: displaying, by the client terminal, the encrypted activation code;

step S6 further comprises: receiving, by the mobile terminal token, the encrypted activation code and the activation authentication code which are input by the user, and decrypting the encrypted activation code according to the activation authentication code to obtain the activation code.

14. The method of claim 1, wherein step S2 specifically comprises: connecting, by the cloud authentication server, the token sequence number and the seed generating factor orderly to obtain the activation code according to a preset connecting and combining method.

15. The method of claim 14, wherein connecting the token sequence number and the seed generating factor orderly to obtain the activation code specifically comprises:

determining, by the mobile terminal token, whether requiring to receive a short message authentication code, if yes, setting the first digit of the activation code to be 1; if no, setting the first digit of the activation code to be 0;

determining the password generating algorithm, if the password generating algorithm is a first preset algorithm, setting the second digit of the activation code to be 1; if the password generating algorithm is a second preset algorithm, setting the second digit of the activation code to be 0;

setting data from the third digit to the twelfth digit of the activation code to be the seed generating factor;

setting data from the thirteenth digit to the twenty-second digit of the activation code to be the token sequence number;

checking the seed generating factor to obtain a first checking value, setting the twenty-third digit of the activation code to be a first checking value;

performing checking calculation on the data from the first digit to the twenty-third digit of the activation code to obtain a second checking value, setting the twenty-fourth digit of the activation code to be the second checking value; and setting the twenty-fifth digit of the activation code to be a preset filling digit, and setting the twenty-fifth digit to be 0.

16. The method of claim 1, wherein
in step S3, encrypting, by the cloud authentication server, the activation code with the activation authentication code to obtain an encrypted activation code further comprises: obtaining, by the cloud authentication server, a corresponding mobile terminal number according to the username, using the mobile terminal number and the activation authentication code to encrypt the activation code to obtain the encrypted activation code; and
in step S6, decrypting the encrypted activation code with the activation authentication code to obtain the activation code further comprises: obtaining, by the mobile terminal token, the mobile terminal number, and decrypting the encrypted activation code to obtain the activation code.

17. The method of claim 1, wherein
in step S3, encrypting the activation code with the activation authentication code to obtain the encrypted activation code further comprises: obtaining, by the cloud authentication server, a pre-stored mobile terminal characteristic data according to the username, and using the mobile terminal characteristic data and the activation authentication code to encrypt the activation code so as to obtain the encrypted activation code; and
in step S6, decrypting the encrypted activation code with the activation authentication code to obtain the activation code further comprises: obtaining, by the mobile terminal token, the mobile terminal characteristic data, and encrypting the encrypted activation code according to the mobile terminal characteristic data and the activation authentication code to obtain the activation code.

18. The method of claim 1, wherein
in step S2, generating the activation code according to the token sequence number and the seed further comprises: obtaining, by the cloud authentication server, a corresponding mobile terminal number according to the username, and generating the activation code according to the token sequence number, the seed generating factor and the mobile terminal number; and
after step S1 and before step S7, the method further comprises: discomposing, by the mobile terminal token, the activation code to obtain the mobile terminal number, intercepting the mobile terminal number, determining whether the mobile terminal number in the activation code matches the intercepted mobile terminal number, if yes, executing step S7; otherwise, prompting information that the present machine is not matched for activation, then ending the procedure.

19. The method of claim 1, wherein
in step S2, generating the activation code according to the token sequence number and the seed further comprises: obtaining, by the cloud authentication server, corresponding mobile terminal characteristic data according to the username, and generating the activation code according to the token sequence number, the seed generating factor and the mobile terminal characteristic data; and
after step S1 and before step S7, the method further comprises: decomposing, by the mobile terminal token, the activation code to obtain the mobile terminal characteristic data, obtaining mobile terminal characteristic data of a present machine, determining whether the mobile terminal characteristic data obtained from the activation code matches the obtained mobile terminal characteristic data, if yes, executing step S7; otherwise, prompting information that the present machine is not matched for activation, then ending the procedure.

* * * * *